(12) United States Patent
Savin

(10) Patent No.: US 6,638,628 B2
(45) Date of Patent: Oct. 28, 2003

(54) SILICATE COATING COMPOSITIONS

(76) Inventor: Ronald R. Savin, 11001 Muirfield Dr., Rancho Mirage, CA (US) 92270

( * ) Notice: Subject to any disclaimer, the term of this patent is extended or adjusted under 35 U.S.C. 154(b) by 0 days.

(21) Appl. No.: 10/126,435

(22) Filed: Apr. 19, 2002

(65) Prior Publication Data

US 2002/0168477 A1 Nov. 14, 2002

Related U.S. Application Data

(60) Provisional application No. 60/285,191, filed on Apr. 20, 2001.

(51) Int. Cl.$^7$ .............................. B05D 3/02; C09D 1/02; B32B 9/04; B32B 13/06
(52) U.S. Cl. ................. 428/446; 428/457; 427/397.8; 427/294; 427/295; 106/38.3
(58) Field of Search ................. 427/397.8, 294, 427/295; 106/38.3; 428/446, 457

(56) References Cited

U.S. PATENT DOCUMENTS

| 3,976,617 | A | * | 8/1976 | Vasta ........................ 523/435 |
| 4,162,169 | A | | 7/1979 | Schutt ........................ 106/74 |
| 4,591,480 | A | * | 5/1986 | Morishita et al. ............... 419/9 |
| 4,917,960 | A | | 4/1990 | Hornberger et al. ......... 428/550 |
| 5,413,628 | A | * | 5/1995 | Savin ...................... 106/14.44 |
| 5,580,907 | A | | 12/1996 | Savin ......................... 523/219 |
| 5,792,803 | A | | 8/1998 | Savin ......................... 523/219 |
| 5,882,798 | A | * | 3/1999 | Hubbard et al. ............ 428/446 |
| 5,888,280 | A | * | 3/1999 | Montes .................... 106/14.21 |
| 6,071,624 | A | | 6/2000 | Hubbard et al. ............ 428/446 |
| 6,468,336 | B1 | * | 10/2002 | Fiedler et al. ............ 106/14.21 |

FOREIGN PATENT DOCUMENTS

| GB | 1095191 | 12/1967 |
| WO | 9958274 | 11/1999 |

* cited by examiner

*Primary Examiner*—Michael Barr
(74) *Attorney, Agent, or Firm*—Ladas & Parry

(57) ABSTRACT

Aqueous zinc-containing coating compositions are provided in which the bonding agent is a blend of sodium and/or potassium silicate and lithium polysilicate the latter being in relatively high proportion particularly over 30% up to 70% by weight of silicate. Preferably the composition contains particulate flaked zinc. The composition is of particular value in enhancing corrosion resistance of articles produced from powdered metal or of non-passivated galvanized artefacts.

13 Claims, No Drawings

SILICATE COATING COMPOSITIONS

This application claims priority from U.S. provisional application Serial No. 60/285,191 filed on Apr. 20, 2001.

FIELD OF THE INVENTION

This invention relates to coating compositions, methods of preparing such compositions and surfaces coated with such compositions. In particular it relates to coatings useful in protection of articles produced by powder metallurgy techniques and otherwise-untreated galvanized articles from corrosion.

BACKGROUND OF THE INVENTION

While one aspect of preparing a coating for a surface is to provide a decorative finish, even more important is to provide a resistance to environmental and atmospheric conditions. This is particularly true of coatings for metallic surfaces where materials present in the atmosphere, including both natural components such as water vapor and pollutants such as acids and other corrosive materials, can damage the surface of the metal. Many of the most commonly used coating materials contain organic resin materials to provide binding for the pigment and other corrosion resistant materials in the composition. Such organic pigments frequently require organic solvents to ensure their dispersion in the composition, which can create major pollution problems.

A particularly valuable type of anti-corrosion composition is one containing zinc. The outstanding corrosion resistance afforded by galvanizing has made it one of the most effective means for long term protection of steel from oxidation (rusting), and subsequent corrosion. It is the conventional method of providing protection for guard rails, transmission towers, light poles, electrical equipment and dozens of other specific applications. A coating of 5 mils or 125 microns of a galvanizing composition can protect its exposed equivalent for a period in excess of 20 years. Galvanizing coatings can be applied both by hot dipping and electroplating but these techniques have their limitations, particularly in regard to the shape of the article during installation. Typically galvanized products are then post treated to avoid the formation of "white rust". In the past such treatments involved use of chromic acid or chromates. Use of these materials is, however, becoming recognized as creating unnecessary environmental hazzards. Today, use of polymer coatings is becoming more common to address this problem Alternatively in some situations, such as water treatment plants, corrosion inhibiting chemicals are being added to water that contacts the galvanized parts. Alternative ways of dealing with the problem are desirable. Coating compositions, sometimes known as zinc rich primers, have been considered to be optimum anti-corrosion coatings on iron or steel substrates. The zinc inhibits rust by reason of an electrochemical interaction between the zinc and steel substrate. It is desirable to avoid too great a binder component to avoid insulating zinc particles from each other and the substrates but this can mean there are difficulties in application because of settling of the composition. There is a very extensive art on the use of zinc in coating compositions alone or in combination with other components such as glass microspheres—see for example U.S. Pat. No. 5,580,907 Ronald R. Savin.

The use of silicate bonded compositions particularly compositions containing zinc has been suggested for various types of surfaces.

In U.S. Pat. No. 5,792,803 there is described the use of alkyl silicates in an anhydrous alkyl alcohol in combination with epoxy or other polymeric resins as a binding agent.

U.S. Pat. No. 5,888,280 (Montes) describes a composition suitable for forming a protective coating on steel substrates comprising zinc dust, a group 1A metal silicate (preferably potassium silicate), a colloidal silica ingredient modified with a group 1A metal (preferably lithium polysilicate) and a carbonate-containing internal hardener.

U.S. Pat. No. 6,071,624 (Hubbard) describes an aqueous barrier coating for polymerizing substrates comprising a lithium-potassium copolysilicate.

U.S. Pat. No. 4,917,960 (Hornberger) describes several different types of coating compositions for coating porous substrates on a metal base particularly for use in heat exchangers. Such substrates may include heat exchangers including a porous coating of bonded metal particles. The coatings applied to such substrates include fugitive materials to ensure that the coating applied to the bonded metal particle layer is also porous. Such fugitive materials maybe comprised of various bonding agents such as sodium or potassium silicates or lithium polysilicate. There is, however, no teaching of the use of a mixture of these materials. The coating may also contain metal particles, preferably particles of the same metal as is used from the substrate, such as aluminum.

British Patent 1,095,191 (Esso Research and Engineering) discloses coating compositions for metal comprising zinc dust and a lithium-sodium silicate solution.

U.S. Pat. No. 4,162,169 (Schutt, assigned to NASA) describes a paint binder for use in protection of ferrous articles or aluminum alloys which comprises a potassium or sodium silicate dispersion having a silicon dioxide to alkali metal molar ratio of 4.8:1 to 6.0:1 which is obtained by using silicon dioxide as a hydrogel and incorporation of a silicone.

It is desirable to use silicates which are soluble in water as distinct from organic silicates which create environmental problems because of the organic solvents.

Potassium silicates have been proposed. Thus for example corrosion-resistant coating can be prepared from zinc and potassium silicate. A powdered material comprising zinc dust, with a small content of mica and zinc oxide (5% or less each) is mixed with a water solution of potassium silicate (20% by weight), potassium hydroxide (0.5 to 5% by weight) and lithium polysilicate (5% by weight) with amorphous silica (5% by weight) and the resulting blend is sprayed onto the surface to be protected. The use of this primarily potassium silicate product has the disadvantage that there is a relatively slow development of water resistance.

The addition of the lithium polysilicate in proportions of 5% to 25% by weight to potassium silicate although found to improve the properties of potassium silicate indicated the contents of any silicate including the lithium polysilicate should be maintained relatively low.

SUMMARY OF THE INVENTION

It has now been determined that if sodium silicate or potassium silicate is combined with lithium polysilicate in a composition containing relatively high proportions or both sodium silicate and/or potassium silicate and lithium polysilicate there is obtained a silicate primer system which is both inexpensive and rapidly develops initial impressive water resistance. Lithium polysilicate ($SiO_2$ 20%, lithium 2%) is extremely effective as a binder for zinc rich coatings over blasted steel and becomes extremely insoluble in a very short period of time. Its adherence to cold rolled steel, galvanized products and other porous substrates is very poor. When subjected to baking for industrial application with or without zinc dust or zinc flake, lithium polysilicate will not bond satisfactorily to unblasted metallic substrates. There is obtained a coating composition which cured within a reasonable time and provided a composition which was then extremely resistant to corrosion even at relatively elevated temperatures.

According to the invention therefore there is provided a coating composition with a silicate binder in which the silicate binder comprises a sodium silicate or potassium silicate with a relatively high proportion of lithium polysilicate. As an embodiment of the invention there is provided a coating composition comprising zinc in particle form together with, as binding component, sodium or potassium silicate together with a significant proportion of lithium polysilicate composition all being dispersed in an aqueous medium.

Such compositions are of particular use in coating powdered metal artefacts and galvanized products that have not been passivated or pretreated, for example with a chromate or equivalent pretreatment.

DETAILED DESCRIPTION OF THE INVENTION

In a particularly preferred embodiment of the invention there is dispersed into the coating composition zinc flake alone or combined with a proportion of zinc powder or zinc dust. As described in Savin International patent application number PCT/US99/06647 (U.S. application Ser. No. 09/075, 302 filed May 8, 1998) the contents of which are incorporated by reference, the zinc flake material provides superior properties with relatively smaller proportions of zinc than were achievable with zinc powder or zinc dust.

The compositions of the present invention are of use in providing corrosion resistance to porous metal artefacts, for example those produced by powder metallurgy techniques in which metal particles are sintered together under pressure to produce artefacts of a desired shape. Since production of artefacts, for example automobile and aircraft parts such as gears and the like, by such techniques is often cheaper than by other processes, it would be desirable to increase use of powder metal techniques for producing such products. However, powder metal products, especially when made of a carbon steel, are particularly prone to corrosion because of their porous nature. Treatment of such artefacts with the zinc-silicate-polysilicate composition of the present invention provides a means for considerable reduction to their susceptibility to corrosion. I have found that use of an internal hardener such as a carbonate is not necessary for this purpose.

Another major use for the compositions of the invention, with or without the inclusion of zinc flake or dust, is in coating galvanized products to avoid the formation of white rust. The use of the compositions of the invention therefore provided a means.

I have found that it is often preferable to employ potassium silicate rather than sodium silicate when using the composition to treat porous metal articles or non-passivated galvanized products since this permits processing at lower temperatures, for example about 275° F. as compared to temperatures in excess of 400° F. which may be required with sodium silicate alone. For example, compositions of the present invention can be cured at temperatures in the range 250° F. to 350° F.

In an alternative embodiment of the invention some or all of the mixture of sodium and/or potassium silicate with lithium polysilicate may be replaced by an alkyl silicate, for example of the type described in my U.S. Pat. No. 5,413,628 which is incorporated herein by reference. Useful alkyl silicates include esters of silicic acid, especially ortho silicic acid with low molecular weight alkanols such as those having up to six carbon atoms. One particular alkyl silicate that may be of use is tetraethyl orthosilicate. When alkyl silicates are present, an additional solubilizing agent such as an alcohol may be of use.

Compositions for use in the invention are prepared as aqueous dispersions. The zinc particles are used in the form of dust or flake. I have found that when flake is used I can achieve good results with substantially lower amounts than with dust. Thus in cases where one is concerned about minimizing any increase in weight to an artefact by application of zinc, zinc flake is preferred. Additionally mixtures of zinc dust and zinc flake may be used. I have found it particularly useful to employ at least 35% of the zinc, for example more than 50% of the zinc, in the form of zinc flake for many applications. I believe that compositions containing zinc flake and a mixture of sodium and/or potassium silicate and lithium polysilicate are novel in that this mixture has not been applied to protect powdered metal parts from corrosion. When used herein the term "zinc dust" refers to particles of a size of from 3 to 10 microns, having an apparent density above 3. Zinc flake refers to particles having a different aspect ratio than dust and having a particle size of 6–50 microns and an apparent density below 3, for example about 2.4.

The aqueous dispersion is either sprayed on to the articles to be treated or they are dipped into the dispersion. When a vacuum is applied to powdered metal parts, it has been found that the absorption of the compositions of the invention may be improved. For example in certain cases it may be possible to penetrate the whole of the artefact being treated, increasing the impregnating mass by as much as 500% further improving overall corrosion resistance. In some cases air drying of the product may be possible although in others heating, possibly up to 600° C. may be necessary to dry the treated artefact.

In some cases agitation may be required in order to bring about good incorporation of all of the components into the composition. I have found particularly useful compositions to be those which include a combination of polyether-modified polydimenthyl siloxane and a silicone antifoaming agent.

Additional materials may be employed in compositions used in the invention. For example, it may be useful to add lithium hydroxide to act as a pH stabilizer for the composition. Suitable concentrations of lithium hydroxide for this purpose are in the range 10 to 30%, preferably 15% to 20%. Another example of possible additives are pigments which may be used to affect the surface appearance of the articles being treated, for example aluminum or, where a black color is desired, a black pigment such as graphite, manganese dioxide or black iron oxide or a mixture of any two or three of these. Coloring of galvanized products has been rare in the past because of the need for passivation. The present invention now permits the coloring of galvanized products for both decorative and functional purposes, for example th coloring of guard rails to alert drivers or the use of orange and white coloring to meet certain Federal Aviation Authority requirements for aircraft warnings Sodium silicate has the advantage of being a low cost material usually dispersed to approximately 40% by weight in water and has been used in roofing granules baked at 1300° F. and in the manufacture of soap and concrete curing compounds.

The use of the sodium silicate with lithium polysilicate give outstanding adhesion to numerous substances including stainless steel, fresh galvanized and other surfaces over which conventional potassium silicate developed inconsistent adhesion.

The precise proportion of sodium or potassium silicate and lithium polysilicate measured in terms of the parts by weight of the two silicates in the final composition can vary substantially depending on the other components and the degree to which the final composition is expected to be resistant to different types of environment. Each of the two silicate types, i.e. (a) lithium polysilicate and (b) sodium and/or potassium silicate measured by dry weight of silica and relative to each other in the final composition will be in the range 1:2 to 2:1 i.e. one third to two thirds of either of the silicate types with the balance being the other type. In a preferred proportion, the lithium polysilicate and sodium silicate and/or potassium silicate will be added by weight in a 1 to 1 proportion by weight to each other in the final composition particularly when one is examining total proportions of silicate close to the outer limits of the ranges for silicates.

I have found that it is preferable to maintain a high molar ratio of $SiO_2$ to alkali metal for example in the range 4 to 7:1 preferably in the range 5 to 6:1.

Typically compositions of the present invention will penetrate a powdered metal artefact to a depth of 10 microns although greater penetration is possible when a vacuum is applied to the artefact being treated.

The sodium silicate is employed in the form of a sodium silicate solution containing approximately 30 to 50% by weight total solids with silicon as $SiO_2$ being from 24 to 30 and sodium as $Na_2O$ approximately 9%, the weight ratio of $SiO_2$ to $Na_2O$ being about 4. Such material is available commercially from, for example, Chemical Products Corporation and PQ Corporation. The composition will contain 50 to 70%. weight water. One useful composition contains about equal amounts of a 30% aqueous solution of silicate mixture and dust. If zinc flake is used, the amount of zinc used may be reduced to from 10–50%, typically 20–30% of what is required when zinc dust is used.

With this sodium silicate there can then be provided a substantial content of lithium polysilicate which is usually provided in the form of a stabilized colloidal solid containing approximately 20% silicate ($SiO_2$) and 2% lithium as LiO, the lithium polysilicate being dispersed in water. The proportion of lithium polysilicate added will be from 30 to 60% by weight lithium polysilicate as compared to sodium polysilicate. Depending on the intended use, such composition may be combined with a zinc material which can be any of the conventional zinc powders or can be a zinc flake material as described in the above mentioned patent application (Savin). This is a flake material produced by a dry milling process.

In preparing the final compositions dispersing agents may be employed. A surprising aspect of the invention is that addition of certain dry finely divided silicates such as mica which is a natural blend of silica and alumina of low particle size to the composition provides a stable coating composition. The mica should be added to the final composition in a proportion of 2 to 10% by weight of the total composition. Mica typically has an analysis 45.5% silica $SiO_2$, 36% $Al_2O_3$, 8.8% potassium oxide and small percentages of ferrous and ferric oxide and is a dry white odorless powder. The mica can be used in the region of 5 to 30 microns, preferably 6 to 10 microns. Other components can be added, for example titanium dioxide or other coloring components. Desirable particles have a median particle of 0.1 to 15 microns.

Use of only silicate as the bonding agent does tend to give a slightly inflexible coating which is perhaps over brittle for certain uses. This can be modified by the addition of small amounts of organic polymeric materials such as water-dispersed lattices of synthetic rubbers, polystyrene, polybutadiene etc., acrylic etc., as well as certain polymers of polyurethanes or possibly glycerols.

The invention will now be described in the accompanying Examples.

EXAMPLE 1

To a sodium silicate comprising a solution in water containing 37.4% by weight total solids, 28.6% by silicon as $SiO_2$, 8.9% sodium as $Na_2O$ by weight ratio of $SiO_2/Na_2O$ of 3.22 obtained from Chemical Products Corporation as Chem-Silate 41A Brand sodium silicate solution, there was added lithium polysilicate on a one to one by weight basis. The lithium polysilicate was supplied in aqueous solution at 22% by weight solids and had the analysis (wt %) $SiO_2$ 20.2, Lithium Oxide; 2.1, Mole Ratio $SiO_2/Li_2O$:4.8, wt ratio $SiO_2/Li_2O$:10.1, total solids: wt % 22.1, Vol % 10.8 and comprising by weight LiOH 2%, $SiO_2$ 20.

For comparison there was used a conventional aqueous potassium silicate binder comprising 20% by weight potassium silicate, 2% by weight potassium hydroxide, 5% by weight lithium polysilicate and 5% by weight colloidal silica (balance water).

The two compositions were applied to a series of surfaces including stainless steel, cold rolled steel, iron, zinc phosphated steel and fresh galvanized steel.

The potassium/lithium silicate comparison composition developed inconsistent adhesion on each of the surfaces.

The sodium silicate/lithium polysilicate compositions of the invention developed hard highly adhesive coatings.

EXAMPLE 2

A coating composition of lithium polysilicate and sodium silicate was prepared as in Example 1 containing equal proportions of lithium polysilicate (22% solids) to sodium silicate (40% solids) and combined with 20 parts by weight of water for 100 parts of Li/Na silicate, 15 parts of zinc flake prepared as in the above identified Savin Patent together with 15 parts of zinc dust, 5% by weight mica and 5% by weight zinc oxide.

A coating of excellent adhesion was obtained when applied to cold rolled steel, bonderized steel and powdered steel gears providing excellent saltfog exposure at 1000 hours exposure (B-117).

EXAMPLE 3

Lithium polysilicate and sodium silicate solutions as described in Example 1 were mixed in proportions 10 parts by weight dry weight lithium polysilicate, 25 parts by dry weight sodium silicate, 5 parts by weight mica, 50 parts zinc dust together with 10 parts by weight water.

A smooth composition of good coating properties was readily obtained with a simple mechanical mixer.

The composition applied to a cold rolled and phosphated steel surfaces (zinc and iron phosphate) and for baked 25 minutes at 300° F. The product resisted 1000 hours of salt fog exposure (B-117).

EXAMPLE 4

A composition was prepared in accordance with Example 3 but there was added an aqueous dispersion polymer latex in the proportion of 10 parts to 100 parts of the zinc coating composition. The resulting composition provided excellent adhesion and flexibility compared with the unmodified composition when applied to cold rolled and bonderized steel (iron phosphate). The composition was also applied over (powdered) metal gears (sintered). Seafog results over all surfaces were excellent with corrosion resistance up to 1000 hours.

EXAMPLE 5

To a sodium silicate comprising a solution in water containing 52% Sodium Silicate (N or 41A), obtained from PQ Corporation there was added lithium polysilicate, lithium hydroxide, BYK 348 and Drewplus L-405. The lithium polysilicate was supplied at 22% and obtained from W. R. Grace. The lithium hydroxide (10% solution in water) was supplied at 100% and obtained from FMC. The BYK 348, a polyether-modified polydimethyl siloxane, was supplied at 1% and obtained by BYK Chemie.USA of Wallingford Conn. The Drewplus L-405, a silicone antifoaming agent, was supplied at 100% and obtained from the Drew Industrial Division of Ashland Chemical Co of Columbus Ohio.

EXAMPLE 6

To a potassium silicate comprising a solution in water contains 60% potassium silicate (29% solids), obtained from Zalcon or PQ Corporation there was added lithium polysilicate, lithium hydroxide, BYK 348 and Drewplus L-405. The lithium polysilicate was supplied at 22% and obtained from W. R. Grace. The lithium hydroxide (10% solution in water) was obtained from FMC. The BYK 348 was supplied at 1%. The Drewplus L-405 was supplied at 0.5%.

What is claimed is:

1. A method for protecting the surface of a powdered metal artefact which comprises applying thereto a coating composition comprising an aqueous containing zinc particles and as bonding agent for the composition a mixture of sodium or potassium silicate and sufficient lithium polysilicate to achieve an adhesive cured coating.

2. A method according to claim 1, wherein the weight ratio of lithium polysilicates to sodium or potassium silicate is from 1:2 to 2:1.

3. A method according to claim 1, wherein the weight ratio of lithium polysilicate to sodium silicate is 1:1.

4. A method according to claim 1, at least 35% by weight of the zinc present is in the form of zinc flake.

5. A method according to any one of the preceding claims wherein a vacuum is applied to the artefact prior to or during application of the coating composition.

6. A method according to claim 1 wherein said bonding agent comprises from 10 to 50% by weight lithium polysilicate, from 25 to 50% by weight sodium silicate or potassium silicate, from 10 to 25% by weight lithium hydroxide, from 1 to 2% by weight of a surfactant and from 1 to 2% by weight of an anti-foaming agent.

7. An aqueous coating composition comprising zinc flake and as bonding agent for the composition a mixture of lithium hydroxide, sodium or potassium silicate and sufficient lithium polysilicate to achieve an adhesive cured coating.

8. A non-foaming aqueous coating composition comprising an aqueous dispersion of zinc particles and a mixture of sodium silicate or potassium silicate and sufficient lithium polysilicate to achieve an adhesive cured coating, lithium hydroxide and a surfactant.

9. A non-foaming aqueous coating composition according to claim 8 which comprises from 10 to 50% by weight lithium polysilicate, from 25 to 50% by weight sodium silicate or potassium silicate, from 10 to 25% by weight lithium hydroxide, from 1 to 2% by weight of a surfactant and from 1 to 2% by weight of an anti-foaming agent.

10. A method of coating a non-passivated galvanized artefact which comprises (a) applying to said artefact a non-foaming aqueous coating composition comprising a mixture of sodium silicate or potassium silicate and sufficient lithium polysilicate to achieve an adhesive cured coating, lithium hydroxide and a surfactant and (b) curing said composition on the artefact at a temperature of from 250 to 350° F.

11. A powdered metal artefact having a surface coating which comprises zinc particles and a mixture of sodium or potassium silicate and lithium polysilicate.

12. An alkyl silicate coating composition comprising 100 parts by weight of a silicate solution containing 20 to 25% by weight alkyl silicate, 50 parts by weight zinc flake, 50 parts by weight zinc dust and 2 parts by weight of a wetting and dispersing agent.

13. A method according to claim 10 wherein said non-foaming aqueous coating composition comprises from 10 to 50% by weight lithium polysilicate, from 25 to 50% by weight sodium silicate or potassium silicate, from 10 to 25% by weight lithium hydroxide, from 1 to 2% by weight of a surfactant and from 1 to 2% by weight of an anti-foaming agent.

* * * * *